(12) United States Patent
Knebel et al.

(10) Patent No.: US 8,472,113 B2
(45) Date of Patent: Jun. 25, 2013

(54) SCANNING MICROSCOPE AND METHOD FOR LIGHT-MICROSCOPIC IMAGING OF AN OBJECT

(75) Inventors: Werner Knebel, Kronau (DE); Heinrich Ulrich, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 13/495,091

(22) Filed: Jun. 13, 2012

(65) Prior Publication Data

US 2012/0320438 A1    Dec. 20, 2012

(30) Foreign Application Priority Data

Jun. 14, 2011    (DE) .......................... 10 2011 051 042

(51) Int. Cl.
*G02B 21/06*    (2006.01)

(52) U.S. Cl.
USPC ........................................................ 359/385

(58) Field of Classification Search
USPC ....................................... 359/205.1, 385, 387
See application file for complete search history.

(56) References Cited

U.S. PATENT DOCUMENTS

| | | | |
|---|---|---|---|
| 5,952,668 A | | 9/1999 | Baer et al. |
| 8,059,336 B2 * | | 11/2011 | Ptitsyn et al. ................. 359/368 |
| 2005/0057798 A1 * | | 3/2005 | Osborne et al. ............... 359/368 |
| 2008/0032414 A1 | | 2/2008 | Zhuang et al. |
| 2009/0134342 A1 | | 5/2009 | Hell et al. |
| 2009/0237765 A1 * | | 9/2009 | Lippert et al. ............. 359/213.1 |
| 2011/0304723 A1 * | | 12/2011 | Betzig ............................. 348/79 |
| 2012/0086795 A1 * | | 4/2012 | Weiss et al. .................... 348/79 |

FOREIGN PATENT DOCUMENTS

| | | |
|---|---|---|
| DE | 4416558 C2 | 4/1997 |
| DE | 102005027077 A1 | 5/2006 |
| DE | 102005007756 A1 | 8/2006 |
| DE | 102006021317 B3 | 10/2006 |
| DE | 102007045897 A1 | 4/2009 |
| DE | 10 2008 018 476 A1 | 10/2009 |
| DE | 102008024568 A1 | 12/2009 |

(Continued)

OTHER PUBLICATIONS

Friedrich, M. et al., "STED-SPIM: Stimulated Emission Depletion Improves Sheet Illumination Microscopy Resolution," Biophysical Journal, Apr. 2011, pp. L43-L45, vol. 100, Biophysical Society, U.S.

(Continued)

*Primary Examiner* — Frank Font
(74) *Attorney, Agent, or Firm* — Patentbar International PC

(57) ABSTRACT

A scanning microscope includes a light source, illumination optics, and a scanning device for moving the illumination focus across a target region and doing so by varying the direction of incidence in which the illuminating beam enters an entrance pupil of the illumination optics. To incline the illumination focus relative to the optical axis of the optics, the scanning device directs the illuminating beam onto a portion of the entrance pupil that is offset from the center of the pupil and, in order to move the illumination focus across the target region, the scanning device varies the direction of incidence of the illuminating beam within said portion. An observation objective is provided which is spatially separated from the illumination optics and disposed such that its optical axis ($O3$) is substantially perpendicular to the target region and at an acute angle ($\alpha$) to the optical axis ($O1$) of the illumination optics.

18 Claims, 13 Drawing Sheets

FOREIGN PATENT DOCUMENTS

| | | |
|---|---|---|
| DE | 10 2009 044 987 A1 | 3/2011 |
| WO | 2006127692 A2 | 11/2006 |
| WO | 2007128434 A1 | 11/2007 |
| WO | 2010012980 A1 | 2/2010 |

OTHER PUBLICATIONS

Extended Search Report from the counterpart application EP12171939.7, mailed on Sep. 29, 2012.

F. Fahrbach, A. Rohrbach: "Microscopy with non diffracting beams", FOM 2009, Krakau.

J. Huisken, J. Swoger, F. Del Bene, J. Wittbold, E. H. K. Stelzer: "Optical Sectioning Deep Inside Live Embryos by Selective Plane Illumination Microscopy", Science 305, 1007 (2004).

A. H. Voie et al.: "Orthogonal-plane fluorescence optical sectioning: three-dimensional imaging of macroscopic biological specimens", Journal of Microscopy 170, 229-236 (1993).

C. Dunsby: "Optically sectioned imaging by oblique plane mirror microscopy", Optic Express vol. 16, 25 (2008).

\* cited by examiner

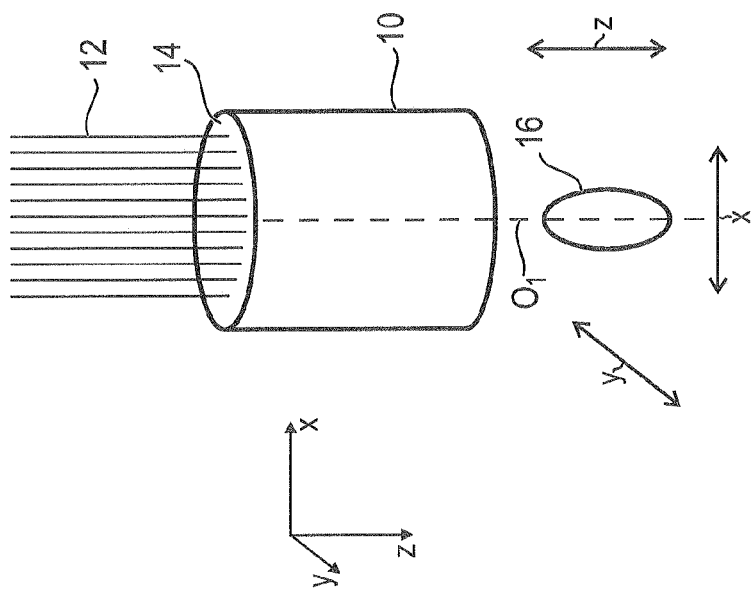
FIG. 1a
FIG. 1b

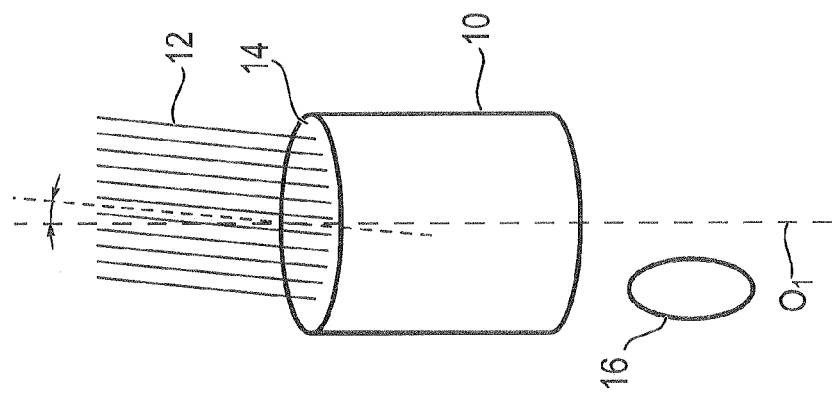
FIG. 2a
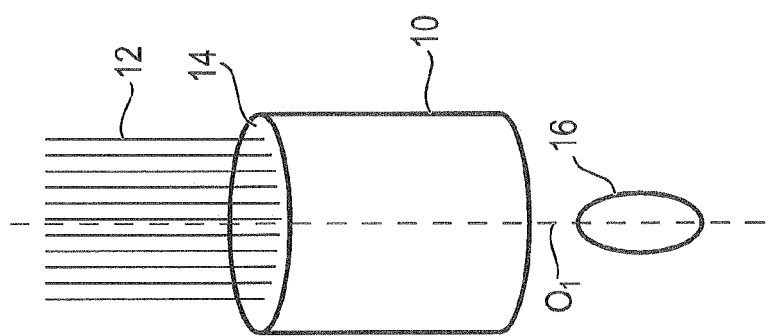
FIG. 2b
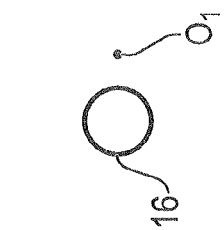
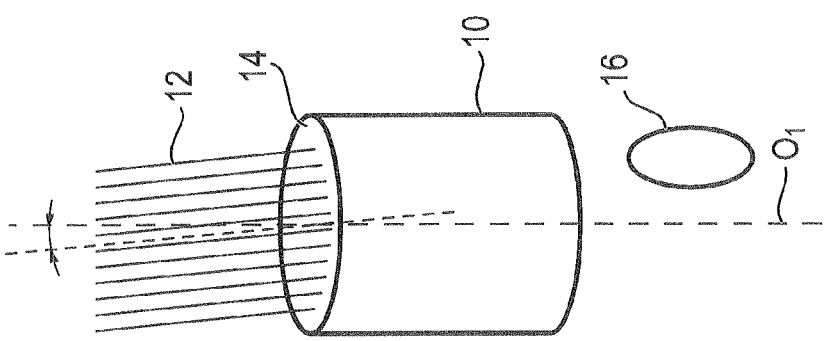
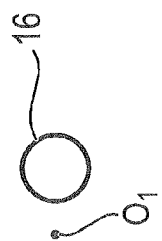
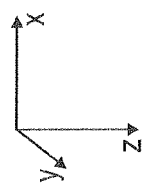
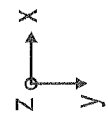

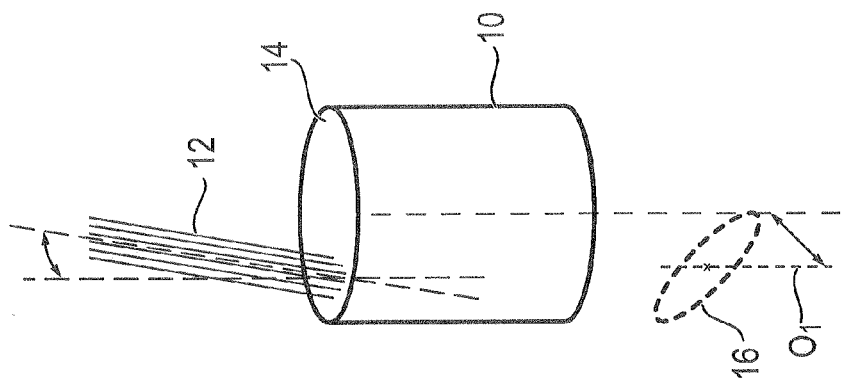
FIG. 4a
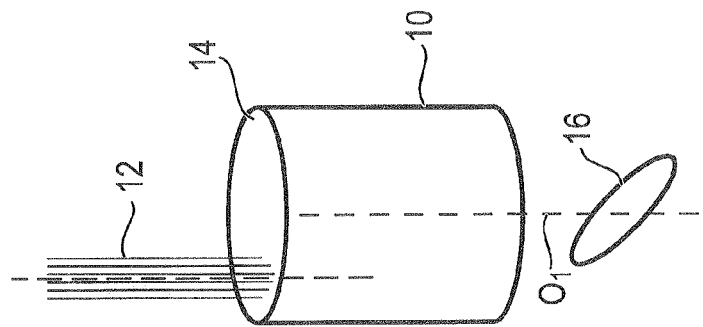
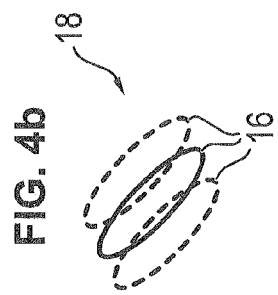
FIG. 4b
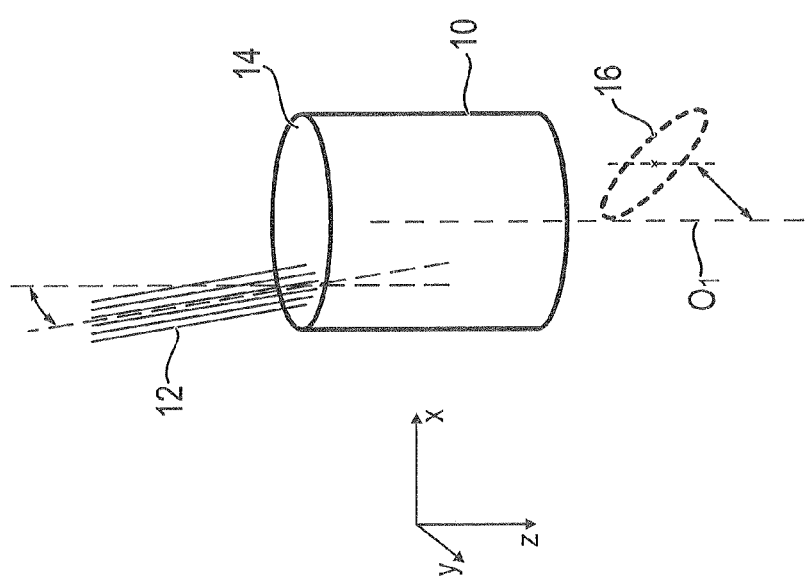

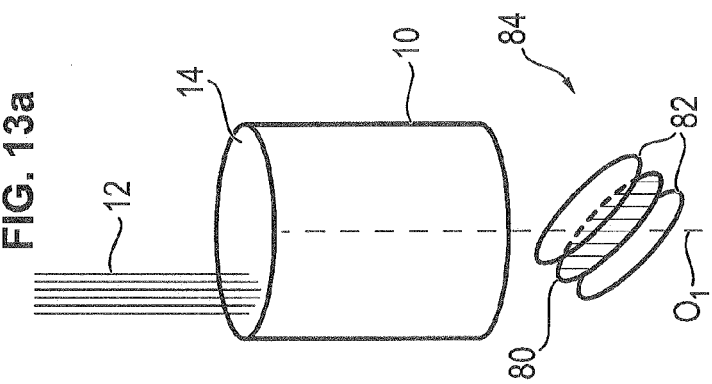
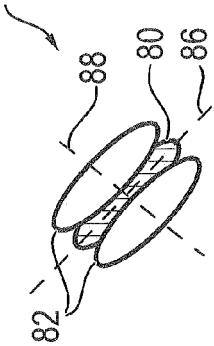

SCANNING MICROSCOPE AND METHOD FOR LIGHT-MICROSCOPIC IMAGING OF AN OBJECT

RELATED APPLICATIONS

This application claims priority to German Patent Application No. 102011051042.7 filed on Jun. 14, 2011, which is incorporated herein by reference in its entirety.

FIELD OF THE INVENTION

The present invention relates to a scanning microscope having a light source for emitting an illuminating light beam, illumination optics for producing an elongated illumination focus in an object to be imaged, and a scanning device for moving the illumination focus across a target region to be illuminated of the object to be imaged and doing so by varying the direction of incidence in which the illuminating light beam enters an entrance pupil of the illumination optics.

BACKGROUND OF THE INVENTION

In the prior art, scanning microscopes have been proposed which are used, for example, in fluorescence microscopy to excite dyes by laser light to emit fluorescent radiation, which is then captured by a detector to form an image of the object to be examined. The microscopes used in this area of microscopy are, in particular, scanning confocal microscopes which, unlike standard microscopes, do not illuminate the entire object at a particular point in time, but produce a typically diffraction-limited spot of light with which the object is scanned point by point. The light signals detected by the detector at the individual object points are then combined to form a complete image of the object.

Such a confocal microscope typically includes a scanning device of the type called a point scanner, which directs the illuminating light beam emitted by the light source into the entrance pupil of the illumination optics. The illumination optics transform the illuminating light beam entering its entrance pupil into a focused light distribution, which will hereinafter be referred to as "illumination focus". The shape and size of the illumination focus depend on the optical properties, particularly the numerical aperture of the illumination optics. If the illuminating light beam enters the entrance pupil of the illumination optics centrally and perpendicularly; i.e., along the optical axis, then the illumination optics produce an elongated illumination focus which has a smaller extent transverse to the optical axis than along the optical axis. Then, in order to scan the object, the illumination focus is moved transversely to the optical axis by the point scanner varying the angle of incidence at which the illuminating light beam enters the entrance pupil of the illumination optics. This can be accomplished using, for example, a movable mirror system.

Thus, in order to form a three-dimensional image using a confocal microscope, the object must be scanned point by point in the manner described above. Since this is a relatively complex process, a microscopy technique referred to in the literature as selective plane illumination microscopy (SPIM) was proposed recently. This technique uses an illumination objective and an observation objective, which are arranged at an angle of 90 degrees relative to each other. The illumination objective, in cooperation with a cylindrical lens located upstream thereof, produces an approximately two-dimensional distribution of illumination light, which passes through the object along the optical axis of the illumination objective. Such a light distribution is frequently also referred to as "light sheet" or "light disk". The target region of the object that is illuminated by this light sheet is imaged by the observation objective onto a detection surface, such as a CCD, the optical axis of the observation objective being perpendicular to the light sheet. If the object is then moved through the light sheet, it is possible to acquire tomographic images of the object using this configuration. In order to produce as thin a light sheet as possible, the illumination objective must have a correspondingly high numerical aperture. Moreover, the free working distance of the illumination objective must be large enough to prevent collision with the observation objective. Accordingly, the numerical aperture of the illumination objective determines the thickness of the light sheet, and thus, the optical resolution along the optical axis of the observation objective.

In a modified SPIM method described in WO 2010/012980 A1, illumination and detection are performed by one and the same objective. To this end, the entrance pupil of the objective is under-illuminated at an off-center position; i.e., the illuminating light beam passes through a portion of the entrance pupil that is transversely offset from the optical axis. A cylindrical lens upstream of the objective produces an illuminating light sheet in the object, which light sheet is inclined to the optical axis of the objective. The target region illuminated by this light sheet is then imaged by the objective.

All of the above-described systems use a cylindrical lens to obtain the desired oblique illumination of the object. However, the use of such a cylindrical lens has disadvantages. For example, these devices are designed exclusively for oblique illumination by means of a light sheet and do not allow for a different use, such as point-by-point confocal scanning. Moreover, it would be desirable to be able to vary the spatial distribution of the light intensity of the light sheet produced for oblique illumination. This is not possible using a cylindrical lens.

For further reading, reference is made to A. H. Voie et al.: "Orthogonal-plane fluorescence optical sectioning: three-dimensional imaging of macroscopic biological specimens", Journal of Microscopy 170, 229-236 (1993); J. Huisken, J. Swoger, F. Del Bene, J. Wittbold, E. H. K. Stelzer: "Optical sectioning deep inside live embryos by selective plane illumination microscopy", Science 305, 1007 (2004); F. Fahrbach, A. Rohrbach: "Microscopy with non diffracting beams", FOM 2009, Krakau; C. Dunsby: "Optically sectioned imaging by oblique plane minor microscopy", Optics Express Vol. 16, 25 (2008); DE 10 2005 027 077 A1; DE 44 16 558 C2; U.S. Pat. No. 5,952,668; WO 2006/127692 A2; DE 10 2006 021 317 B3; WO 2007/128434 A1; US 2009/01354342 A1; DE 10 2008 024 568 A1; US 2008/0032414 A1.

SUMMARY OF THE INVENTION

In methods using an illumination objective and a separate observation objective, the two objectives are typically arranged at an angle of 90 degrees relative to each other. This arrangement of the objectives, where the illumination axis and the observation axis are perpendicular to each other, can be a disadvantage in the imaging of certain biological objects. For example, it is often not possible to place spherical objects in a collision-free position under such a right-angled arrangement of objectives. Such spherical objects are used, for example, when tissue cultures in the eye of a mouse or rat are to be examined. In such situations, the conventional arrangement of objectives frequently results in shading by surrounding tissue.

It is an object of the present invention to improve a scanning microscope of the type mentioned at the outset in such a way that it allows collision-free light-microscopic imaging, even under difficult geometric conditions.

According to the invention, this object is achieved in that, in order to incline the illumination focus relative to the optical axis of the illumination optics, the scanning device directs the illuminating light beam onto a portion of the entrance pupil of the illumination optics that is offset from the center of the pupil and, in order to move the illumination focus across the target region to be illuminated, the scanning device varies the direction of incidence of the illuminating light beam within said portion, and in that an observation objective is provided which is spatially separated from the illumination optics and disposed such that its optical axis is substantially perpendicular to the illuminated target region and at an acute angle to the optical axis of the illumination optics.

The present invention proposes, first of all, to partially illuminate the entrance pupil of the illumination optics with the illuminating light beam at an off-center position by directing the illuminating light beam onto a portion of the entrance pupil that is offset from the center of the pupil. Partial illumination of the entrance pupil; i.e., the feature of not allowing the illuminating light beam to pass through the entire area of the entrance pupil, and thus, not using the full aperture, produces a widening of the (already elongated) illumination focus in both the longitudinal and transverse directions. Since, in addition, the illuminating light beam strikes the entrance pupil off-center, the illumination focus is inclined relative to the optical axis of the illumination optics.

The illumination focus widened and inclined in this manner can then be used to sequentially generate a light sheet illuminating the target region. This is accomplished by means of the scanning device, which produces a suitable scanning motion of the illuminating light beam in the entrance pupil of the illumination optics. This scanning motion corresponds to a tilting of the illuminating light beam about a tilt point located in the region of the entrance pupil. This means that the illuminating light beam, which, of course, is not a ray in a mathematical sense, but rather a bundle of light rays, remains (at least approximately) stationary in the region of the entrance pupil, while at a distance from the entrance pupil (toward the scanning device), it performs, as it were, a pivoting motion relative to a reference direction parallel to the optical axis. The tilting or pivoting motion of the illuminating light beam is translated by the illumination optics into a corresponding motion of the inclined illumination focus transverse to the optical axis. The actual magnitude of the motion of the illumination focus in the object depends on the specific design of the illumination optics. However, what is essential is that the tilting of the illuminating light beam caused by the scanning device is used in accordance with the present invention to move the illumination focus within the target region of the object and to thereby, as it were, generate a light sheet which illuminates the target region.

Unlike the prior art approaches which employ a cylindrical lens to produce a light sheet, the scanning microscope of the present invention generates the light sheet sequentially by means of the scanning device, which does so by moving the illumination focus across the target region within one scanning period. To this end, the scanning period with which the scanning device is operated may be adjusted to be significantly shorter than the detection cycle of a photodetector onto which the target region is imaged by the illumination optics. Accordingly, the photodetector, which may, for example, be an area detector, CCD, CMOS, APD array, or the like, "sees" the moving illumination focus in a temporally and, therefore, spatially unresolved manner. Rather, it sees a continuous light distribution in the form of a light sheet.

Since a scanning device which moves the illuminating light beam is provided in a conventional scanning confocal microscope anyway, the illuminating light sheet can be generated particularly efficiently using the present invention. In particular, it is possible to use the same microscope configuration for different applications. Thus, in order to implement the application of the present invention, where the object is obliquely illuminated by means of a light sheet, it is only necessary to ensure off-center partial illumination of the entrance pupil of the illumination optics in a scanning confocal microscope having a per se standard configuration. This can be accomplished, for example, by an optical element inserted into the path of the illuminating light beam. If the scanning microscope is to be subsequently operated with point-by-point illumination again, then it is only necessary to remove the optical element from the path of the illuminating light beam.

The scanning microscope of the present invention makes it possible to acquire high-resolution cross-sectional images of the object. To this end, the object is scanned step-by-step with the light sheet. This scanning process may be carried out, for example, by moving the object relative to the optical axis along or transverse to the optical axis.

In accordance with the present invention, an observation objective is provided which is spatially separated from the illumination optics and whose optical axis is substantially perpendicular to the light sheet generated by the moving illumination focus and at the same time at an acute angle to the optical axis of the illumination optics. An acute angle is understood to be an angle less than the 90-degree angle provided in conventional arrangements. Thus, this acute angle specifies the angle between the illumination axis defined by the optical axis of the illumination optics and the observation axis defined by the optical axis of the observation objective. The magnitude of this angle is to be selected depending on the specific configuration used, in particular depending on the shape of the object to be examined. Preferably, the acute angle is in a range from 20 to 80 degrees, a particularly preferred value within this range being 50 degrees.

The scanning illumination focus which, according to the present invention, is inclined defines an inclined object plane, which is imaged by the observation objective. The observation objective is aligned such its optical axis is perpendicular to said object plane. The present invention allows the object plane to be aligned particularly easily by displacing the illumination beam, according to the desired orientation, from the center of the pupil at the entrance to the illumination optics. The greater the displacement of the illumination beam from the center of the pupil, the greater the inclination of the illumination focus, and thus of the object plane defined by the moving illumination focus relative to the optical axis of the illumination optics.

Preferred objective systems for use as the illumination optics and the observation objective are those having a relatively large free working distance (e.g., greater than 1 mm). Both illumination and observation may be carried out using either a dry objective or an immersion objective using water or another liquid as the immersion medium.

Preferably, in order to produce a light sheet which is formed by the moving illumination focus and is inclined relative to the optical axis of the illumination optics, the scanning device varies the direction of incidence of the illuminating light beam in a plane of incidence which is parallel to and offset from the optical axis of the illumination optics. The observation objective is disposed such that its optical axis is perpendicular to the generated light sheet. Assuming that the entrance pupil of the illumination optics is circular in shape, the aforementioned plane of incidence, when viewed from above, forms a straight line which intersects the circle defined by the edge of the pupil in two different points in the manner of a secant without crossing the center of this circle. In the above-defined view from above, the illuminating light beam then performs a tilting motion along this secant. The illumination optics translate this tilting motion into a corresponding motion of the illumination focus along a straight line running parallel to the aforementioned secant. In this way, the desired light sheet for illuminating the target region can be generated in a simple manner.

In another advantageous embodiment, the scanning device includes a control unit and a first adjustment unit coupled to the control unit for varying the inclination of the light sheet, as well as a second adjustment unit coupled to the control unit for moving the observation objective. The control unit controls the two adjustment units in a synchronized manner such that the optical axis of the observation objective remains oriented perpendicular to the light sheet adjusted by the first adjustment unit. This design makes it possible to vary the inclination of the light sheet, and thus of the object plane defined by the light sheet. In addition, by suitably controlling the two adjustment units, the control unit ensures that the observation objective is adjusted in position to maintain the observation objective in perpendicular alignment with respect to the object plane.

In one possible embodiment, the illumination optics are mounted so as to be movable along an adjustment direction perpendicular to the optical axis thereof. In this embodiment, moreover, the first adjustment unit includes an actuator which moves the illumination optics along the adjustment direction to vary the inclination of the light sheet. By moving the illumination optics perpendicularly to its optical axis, the portion of the entrance pupil through which the illuminating light beam enters can be moved away from or toward the center of the pupil to increase or reduce the inclination of the illumination focus.

In an alternative embodiment, the first adjustment unit includes an optical displacement element which is disposed in the path of the illuminating light beam between the light source and the illumination optics and is mounted so as to be movable along an adjustment direction transverse to the optical axis of the illumination optics and which displaces the plane of incidence of the illuminating light beam parallel to the optical axis of the illumination optics, the first adjustment unit further including an actuator which moves the displacement element along the adjustment direction to vary the inclination of the light sheet. The actuator may move the displacement element either rectilinearly; i.e., perpendicularly to the optical axis of the illumination optics, or alternatively along a curved path; e.g., pivoted about a pivot axis. Furthermore, the actuator may be designed to allow the displacement element to be completely removed from the path of the illuminating light beam. In this case, the scanning microscope of the present invention may be used like a conventional scanning confocal microscope where the object is illuminated point by point.

The optical displacement element may, for example, be a transparent plane-parallel or wedge-shaped plate which produces the desired displacement of the illuminating light beam from the center of the entrance pupil of the illumination optics.

In another alternative embodiment, the first adjustment unit includes an aperture which is disposed in the region of the entrance pupil of the illuminating optics and has an aperture opening allowing a portion of the illuminating light beam to pass therethrough, and which is mounted so as to be movable along an adjustment direction perpendicular to the optical axis of the illumination optics, the first adjustment unit further including an actuator which moves the aperture along the adjustment direction to vary the inclination of the light sheet. The size of the aperture opening determines the effective diameter of the illuminating light beam entering the illumination optics. Preferably, the size of the aperture opening is variable, so that the dimensions of the illumination focus can be varied by adjusting the aperture opening. The smaller the aperture opening, the greater the widening of the illumination focus.

The off-center partial illumination of the entrance pupil of the illumination optics, as proposed by the present invention, can also be implemented in a different way than described above. For example, it is conceivable to displace the illuminating light beam parallel to the optical axis of the illumination optics already in its path upstream of the scanning device and to reduce its diameter according to the desired partial illumination. The parallel displacement of the illuminating light beam may be accomplished, for example, by inserting glass plates in an inclined orientation. If the scanning device includes a movable minor system, such as is common in conventional scanning confocal microscopes, the aforementioned parallel displacement may serve to cause the illuminating light beam to strike the mirror system at a reflection point which is offset from a reflection point at which the illuminating light beam strikes the mirror system in a conventional confocal application. This displacement, which is already implemented in the scanning device, then results in the desired off-center position of the illuminating light beam in the entrance pupil of the illumination optics.

Preferably, the scanning microscope of the present invention includes an image sensor which, together with the observation objective, forms a detection unit which can be moved by the second adjustment unit. In particular, in this embodiment, the image sensor and the observation objective are jointly adjusted in position to at all times maintain the image sensor and the observation objective aligned with respect to each other.

In a particularly preferred embodiment, the illuminating light beam is composed of an excitation beam and a depletion beam which are superimposed on each other before entering the scanning device. The illumination optics produces an excitation focus from the excitation beam and a depletion focus from the depletion beam, the excitation beam and the depletion beam being superimposed on each other to form the illumination focus. In fluorescence microscopy, such a depletion beam may be used, for example according to the so-called STED method, to increase the spatial resolution of the light-microscopic image beyond the diffraction limit. In the STED method, fluorescent dyes, which are used for labeling individual regions of the object, are selectively depleted by the depletion beam in a manner known per se, and thus, as it were, switched off in order to increase the resolving power. In the scanning microscope of the present invention, the use of the STED method makes it possible to narrow the effective width of the illumination focus, and thereby make the resulting light sheet thinner, in order to increase the resolution, said narrowing being achieved by superimposing the excitation beam with the depletion beam. Since the depletion beam is superimposed on the excitation beam before reaching the scanning device, the two superimposed light beams are jointly tilted by the scanning device in the entrance pupil of the illumination optics.

Preferably, the depletion focus has a spatial light intensity distribution which exhibits a minimum in a plane in which the illumination focus composed of the excitation focus and the depletion focus is moved to generate a light sheet, as well as a maximum on both sides of said plane. While in conventional STED applications, the depletion focus is donut-shaped in cross section, the aforementioned embodiment provides a focus which in cross section has two intensity maxima (above and below the plane in which the illumination focus is moved to generate the light sheet) and a minimum between said maxima. Preferably, this cross-sectional intensity profile is symmetric and exhibits two maxima of equal magnitude and a zero crossing as a minimum therebetween.

This advantageous embodiment takes advantage of the fact that STED depletion is not necessary, and even unwanted, in the plane in which the illumination focus is moved to generate the light sheet. In the approach of the present invention, the intention is to generate a light sheet that has as large a surface area as possible and, at the same time, is as thin as possible to be able to acquire cross-sectional images with high spatial resolution. The area of the light sheet is determined by the length of the moving illumination focus, while the thickness of the sheet is determined by the extent of the illumination focus transverse to the plane in which the illumination focus is moved. The aforedescribed depletion focus is specifically shaped to reduce the excitation effect of the excitation focus only in the direction of the transverse extent of the focus, but not in the direction of its longitudinal extent.

It is conceivable to equip the scanning microscope of the present invention with an element serving to vary the intensity of the illuminating light beam within a scanning period during which the illumination focus is moved across the target region. This embodiment uses the fact that the light sheet illuminating the target region is sequentially generated by the moving illumination focus. This makes it possible to achieve modulated or patterned illumination of the target region. To this end, the intensity of the illuminating light beam is varied within the scanning period during which the illumination focus scans across the target region. In this way, the intensity of the illuminating light beam can be adjusted as desired at any point of time within the scanning period, and thus, at any position of the target region. The element used for varying the intensity of the illuminating light beam within the scanning period may be, for example, an acousto-optic tunable filter (AOTF), an acousto-optic modulator (AOM), or an electro-optic modulator (EOM).

According to another aspect of the present invention, there is provided a method for light-microscopic imaging of an object having the features of claim 13.

The method of the present invention can be advantageously used in localization microscopy. Using controlled illumination, it is possible to achieve single-molecule detection. The locations of the fluorescent dyes used can then be identified by determining the centroids of the detected photons.

The method of the present invention may be particularly beneficially used for imaging spherical biological objects such as, for example, a tissue culture in the eye of a mouse or rat.

BRIEF DESCRIPTION OF THE DRAWINGS

The present invention will now be described in greater detail with reference to the drawings, in which:

FIG. 1a is a schematic view wherein the entrance pupil of illumination optics for producing an illumination focus is fully illuminated, as is the practice in conventional scanning confocal microscopy;

FIG. 1b is a top view of the illumination focus shown in FIG. 1a;

FIG. 2a is a schematic view showing how scanning is performed by tilting an illuminating light beam entering the entrance pupil of the illumination optics, as is the practice in conventional scanning confocal microscopy;

FIG. 2b is a top view of the illumination focus shown in FIG. 2a;

FIG. 3b is a top view of the illumination focus shown in FIG. 3a;

FIG. 4a is a schematic view showing how scanning is performed according to the present invention by tilting the illuminating light beam that under-illuminates the entrance pupil of the illumination optics;

FIG. 4b is a schematic view illustrating a motion sequence of the illumination focus shown in FIG. 4a;

FIG. 13a is a schematic view illustrating the superposition of an excitation focus with a depletion focus; and FIG. 13b is a top view of the excitation focus and the depletion focus shown in FIG. 13a.

DETAILED DESCRIPTION OF THE PREFERRED EMBODIMENTS

The principle of off-center partial illumination of the entrance pupil according to the present invention will now be described with reference to FIGS. 1 through 4. In particular, it will be described how, according to the present invention, illumination optics 10 produce an illumination focus 16 from an illuminating light beam 12 incident on an entrance pupil of illumination optics 10. In this connection, it should be noted that the above-mentioned figures are purely schematic and are merely intended to facilitate the understanding of the present invention.

Referring first of all to FIG. 1a, the bundle of rays constituting illuminating light beam 12 uses the full aperture of illumination optics 10; i.e., passes through the entire area of entrance pupil 14 of illumination optics 10, which is typical in conventional point-by-point confocal scanning. In FIG. 1a, the optical axis of illumination optics 10 is denoted by O1. In the case depicted in FIG. 1a, illuminating light beam 12 is aligned parallel to optical axis O1 of illumination optics 10. Thus, illumination optics 10 produces a focused light distribution in the form of illumination focus 16, which has a greater extent along optical axis O1 than transverse to optical axis O1.

In the following explanations, reference is made to a coordinate system whose x-axis is oriented horizontally in the plane of the paper and whose z-axis is oriented vertically in the plane of the paper, while the y-axis points out of the plane of the paper. With this definition, entrance pupil 14 is parallel to the x-y plane, while optical axis O1 extends parallel to the z-axis.

FIG. 1b shows illumination focus 16 in a top view, looking along optical axis O1. In this conventional set-up, illumination focus 16 is circular in top view.

FIG. 2 illustrates how the position of illumination focus 16 changes when illuminating light beam 12 is tilted in entrance pupil 14 of illumination optics 10. In the case shown in FIG. 2a, it is assumed that the central ray of the bundle of rays constituting illuminating light beam 12 is tilted in a plane of incidence which is parallel to the x-z plane. It is also assumed that illuminating light beam 12 still passes through the entire area of entrance pupil 14; i.e., illuminates the entire entrance pupil 14.

Illuminating light beam 12 is tilted in the plane of incidence such that it changes its direction of incidence relative to optical axis O1. This change in the direction of incidence is translated by illumination optics 10 into a movement of illumination focus 16 transverse to optical axis O1. In the case shown in FIG. 2a, this movement is along the x-axis. Since illuminating light beam 12 still passes through the entire area of entrance pupil 14, illumination focus 16 remains oriented such that its longitudinal extent is parallel to optical axis O1. This can also be seen in the top views of FIG. 2b, in which the illumination focus 16 is still circular.

Figure 3A:
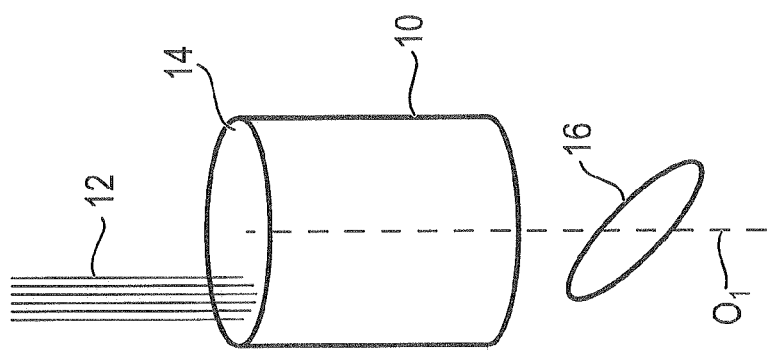
FIG. 3a is a schematic view illustrating the partial illumination of the entrance pupil of the illumination optics with the illuminating light beam, as proposed by the present invention.
Figure 3B:

FIG. 3a illustrates the partial illumination of entrance pupil 14 of illumination optics 10 according to the present invention. As can be seen in FIG. 3a, illuminating light beam 12 passes through only a portion of entrance pupil 14, said portion being located off-center; i.e., offset from the center of the pupil transversely to optical axis O1. This off-center position of illuminating light beam 12 in entrance pupil 14 results in illumination focus 16 being inclined relative to optical axis O1. This can also be seen in the top view of FIG. 3b, in which illumination focus 16 is no longer circular, but rather is longer in the direction of the x-axis than in the direction of the y-axis. Moreover, partial illumination of entrance pupil 14 produces a widening of illumination focus 16; i.e., illumination focus 16 is overall larger than when illuminating the full entrance aperture 14.

FIG. 4a shows the case where an illuminating light beam 12 that under-illuminates entrance pupil 14 at an off-center position is tilted. In the case shown in FIG. 4a, it is assumed that the central ray of the bundle of rays constituting illuminating light beam 12 is tilted in a plane of incidence which is parallel to optical axis O1 and parallel to the y-z plane. This means that in FIG. 4a, illuminating light beam 12 is tilted out of and into the plane of the paper. This tilting of illuminating light beam 12 is translated by illumination optics 10 into a corresponding movement of the inclined illumination focus 16 along the y-axis. Accordingly, in FIG. 4a, illumination focus 16 is moved out of and into the plane of the paper. This is also illustrated in FIG. 4b.

The motion sequence of illumination focus 16 shown in FIG. 4b illustrates how a light sheet 18 is generated within a scanning period by moving illumination focus 16. The aforementioned scanning period is the period of time within which illuminating light beam 12 performs a complete tilting movement. This scanning period is shorter than a detection period with which a photodetector (not shown in FIGS. 4a and 4b) operates to generate an image; i.e., to capture the moving illumination focus 16. This means that the photodetector captures illumination focus 16 in a temporally and, therefore, spatially unresolved manner. Rather, it detects a continuous light distribution in the form of light sheet 18.

Figure 5:
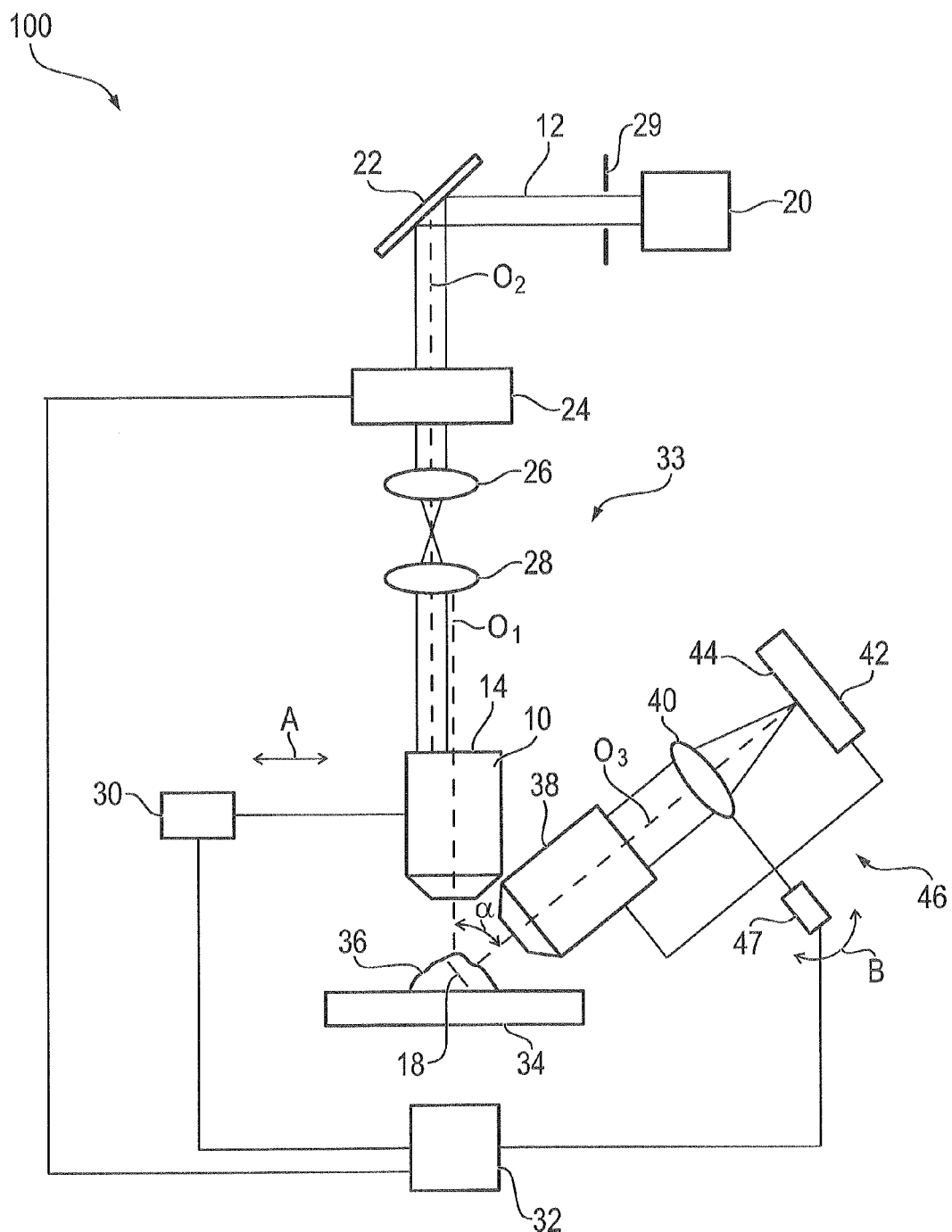
FIG. 5 is a view of a scanning confocal microscope according to a first embodiment.

FIG. 5 shows in schematic form a scanning confocal microscope 100 as a first exemplary embodiment. Scanning microscope 100 is configured to operate according to the illumination principle delineated in FIGS. 3 and 4. In this connection, it should be noted that components of scanning microscope 100 which are not essential to the understanding of the subject matter of the present invention are omitted in the view of FIG. 5.

Scanning microscope 100 is configured as a confocal fluorescence microscope having a laser light source 20 which emits illuminating light beam 12. The wavelength of illuminating light beam 12 is selected such that the fluorescent dyes employed in the microscopy technique used are excited by illuminating light beam 12 to emit fluorescent radiation.

Illuminating light beam 12 strikes a mirror 22 which directs it to a galvanometer mirror system 24, which is shown purely schematically in FIG. 5. Galvanometer mirror system 24 serves to deflect illuminating light beam 12 in such a way that it performs the scanning motion illustrated in FIG. 4a. To this end, galvanometer mirror system 24 is correspondingly moved by a mirror actuator (not explicitly shown). Subsequently, illuminating light beam 12 passes through a scanning lens 26 and a tube lens 28 and finally strikes illumination optics 10.

The optical axis along which illuminating light beam 12 is incident on illumination optics 10 is designated O2 in FIG. 5. Optical axis O2 is parallel to and offset from optical axis O1 of illumination optics 10, which extends centrally through entrance pupil 14. Moreover, the illuminating light beam 12 entering illumination optics 10 does not fully illuminate entrance pupil 14. This means that illuminating light beam 12 passes through only a portion of entrance pupil 14, and thus, does not use the full aperture of illumination optics 10. This partial illumination of entrance pupil 14 is achieved by an aperture 29 which suitably restricts the diameter of illuminating light beam 12 emitted by laser light source 20. In the exemplary embodiment shown in FIG. 5, aperture 29 is positioned upstream of mirror 22. However, it may also be disposed at another location in the path of illuminating light beam 12. The opening of aperture 29 is variably adjustable, whereby the cross-sectional area of the illuminating light beam 12 incident on entrance pupil 14 of illumination optics 10, and thus the partial illumination of entrance pupil 14, can be varied as desired.

In order to be able to variably adjust the off-center portion of entrance pupil 14 that is traversed by illuminating light beam 12, illumination optics 10 are mounted so as to be movable along an adjustment direction, which is denoted in FIG. 5 by double-headed arrow A. Adjustment direction A is perpendicular to optical axis O1 of illumination optics 10.

A first actuator 30 coupled to illumination optics 10 serves to move illumination optics 10 along adjustment direction A. Actuator 30 is controlled by a control unit 32.

Components 24, 26, 28, 30 and 32 shown in FIG. 5 form part of a scanning device, generally designated 33, which serves to tilt illuminating light beam 12 in entrance pupil 14 of illumination optics 10 in the manner illustrated in FIGS. 4a and 4b. Scanning device 33 cooperates with illumination optics 10 to generate light sheet 18, which illuminates a target region to be imaged of an object 36 located on an microscope slide 34.

Scanning microscope 100 further has an observation objective 38 which is aligned with respect to sample 36 such that its such that its optical axis, which is designated O3 in FIG. 5, is perpendicular to light sheet 18. Since light sheet 18 is inclined relative to optical axis O1 of illumination optics 10, optical axis O3 of observation objective 38 and optical axis O1 of illumination optics 10 form an acute angle α, which is less than 90 degrees. In the exemplary embodiment shown in FIG. 5, angle α is about 60 degrees.

The target region of object 36 that is illuminated with light sheet 18 is imaged by observation objective 38 through a tube lens 40 onto a photodetector 42. In this process, optical axis O3 of observation objective 38 is perpendicular to a light-receiving surface 44 of photodetector 42. Observation objective 38, tube lens 40 and photodetector 42 form a detection unit 46, which can be tilted by a second actuator 47 to align optical axis O3 perpendicular to light sheet 18, as indicated in FIG. 5 by double-headed arrow B. Second actuator 47 is also controlled by control unit 32.

Control unit 32 controls the two actuators 30 and 47 such that when illumination optics 10 is moved along adjustment direction A, detection unit 46 including observation objective 38 is adjusted in position by tilting it in direction B so as to maintain observation objective 38 oriented with its optical axis O3 perpendicular to the light sheet 18, whose position is variable. Thus, the movement of illumination optics 10 along adjustment direction A and the tilting of detection unit 46 in tilting direction B are synchronized by control unit 32 so as to at all times maintain the perpendicular alignment of observation objective 38 with respect to light sheet 18.

Figure 6:
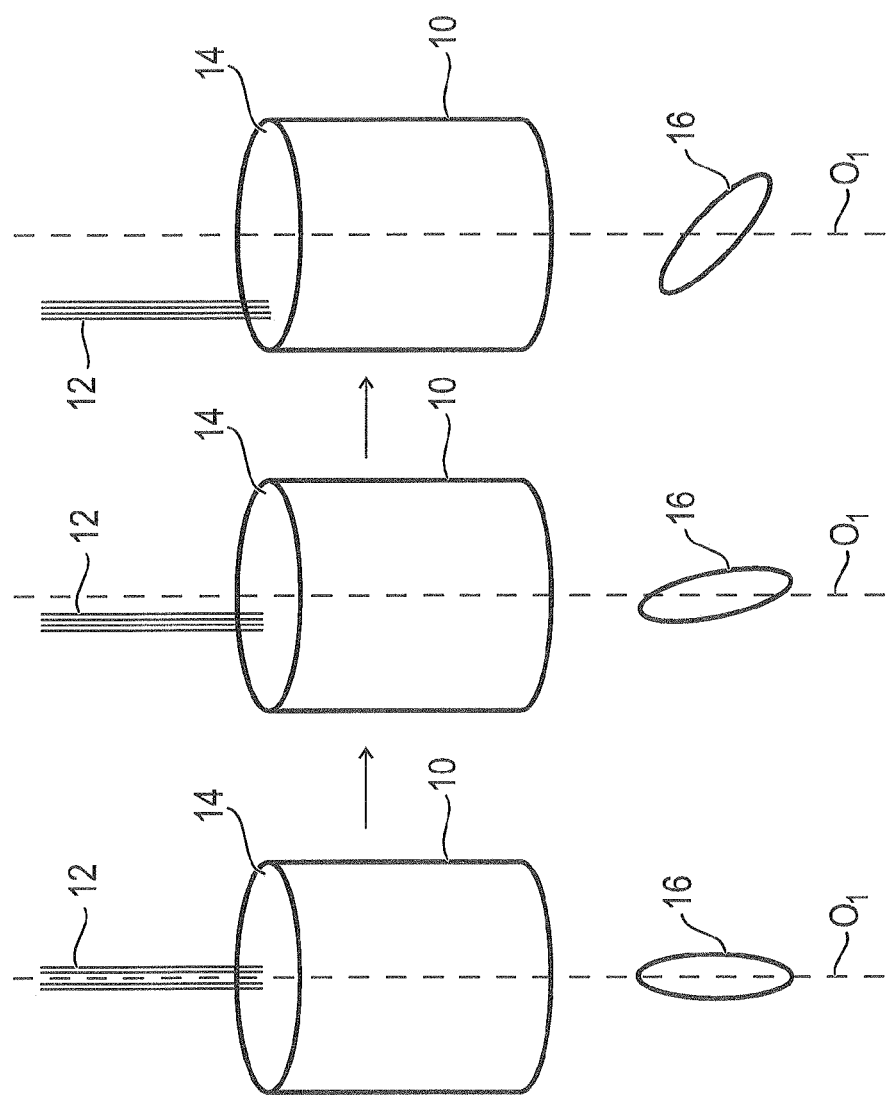
FIG. 6 is a schematic view showing how the illumination focus is inclined by moving the illumination optics as depicted in FIG. 5.

The schematic view of FIG. 6 illustrates how in the exemplary embodiment shown in FIG. 5, movement of illumination optics 10 perpendicular to optical axis O1 varies the inclination of illumination focus 16. As shown in the left sub-figure of FIG. 6, elongated illumination focus 16 is aligned along optical axis O1 when illumination beam 12 is incident centrally on entrance pupil 14 of illumination optics 10. When illumination optics 10 is moved perpendicularly to its optical axis O1 such that illuminating light beam 12 shifts from the center toward the edge of the pupil, then illumination focus 16 is increasingly inclined relative to optical axis O1. This illustrates how the orientation of light sheet 18 generated by illumination focus 16 can be varied by moving illumination optics 10.

Figure 7:
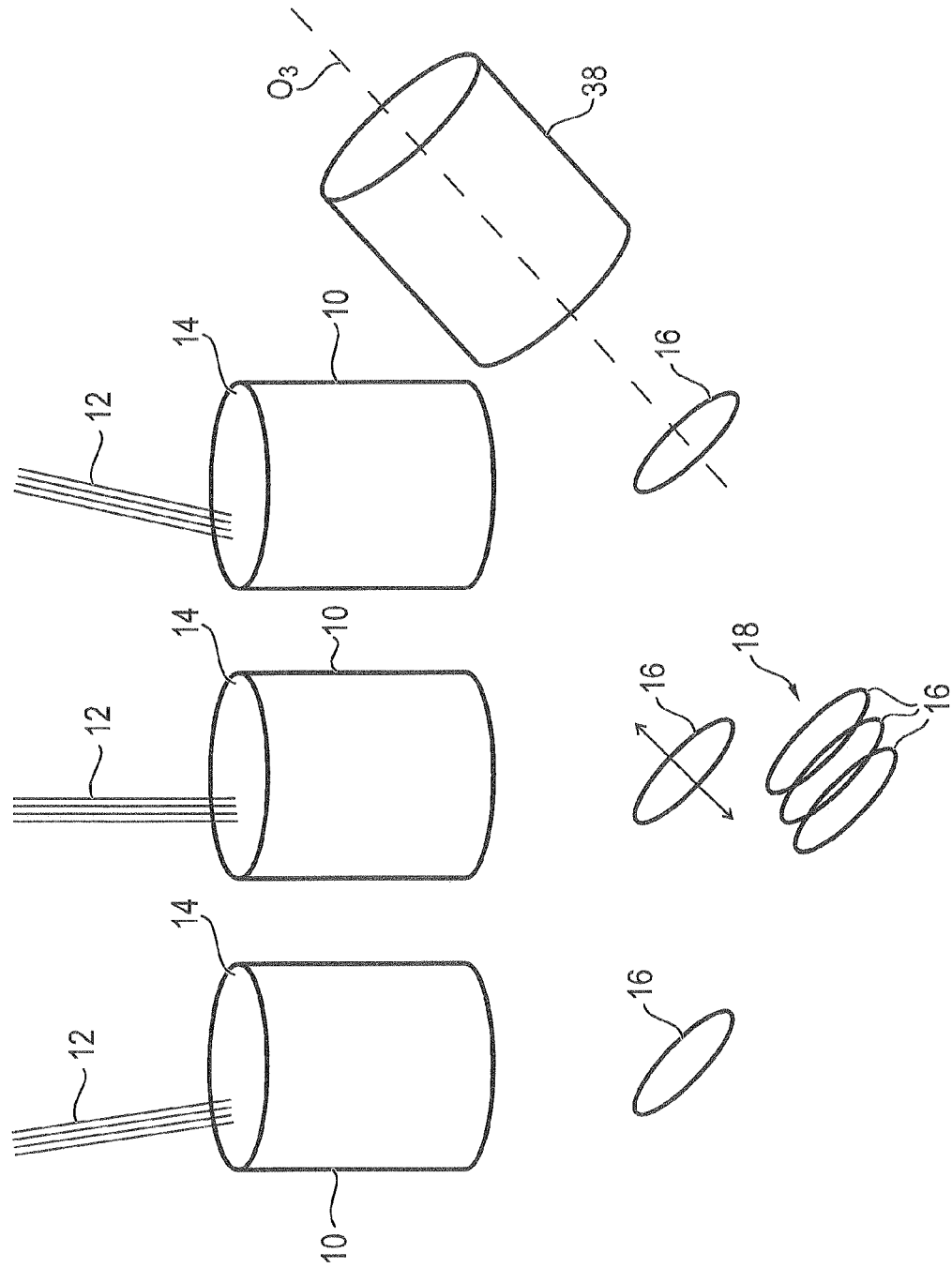
FIG. 7 is a schematic view illustrating the alignment of the observation objective to the inclined illumination focus.

FIG. 7 once again illustrates how observation objective 38 is aligned with respect to illumination focus 16 produced by illumination optics 10. Specifically, optical axis O3 of observation objective 38 is perpendicular relative to the longitudinal extent of illumination focus 16. Moreover, FIG. 7 once again shows how light sheet 18 is generated from moving illumination focus 16 by tilting illuminating light beam 12 in entrance pupil 14 of illumination optics 10.

Figure 8:
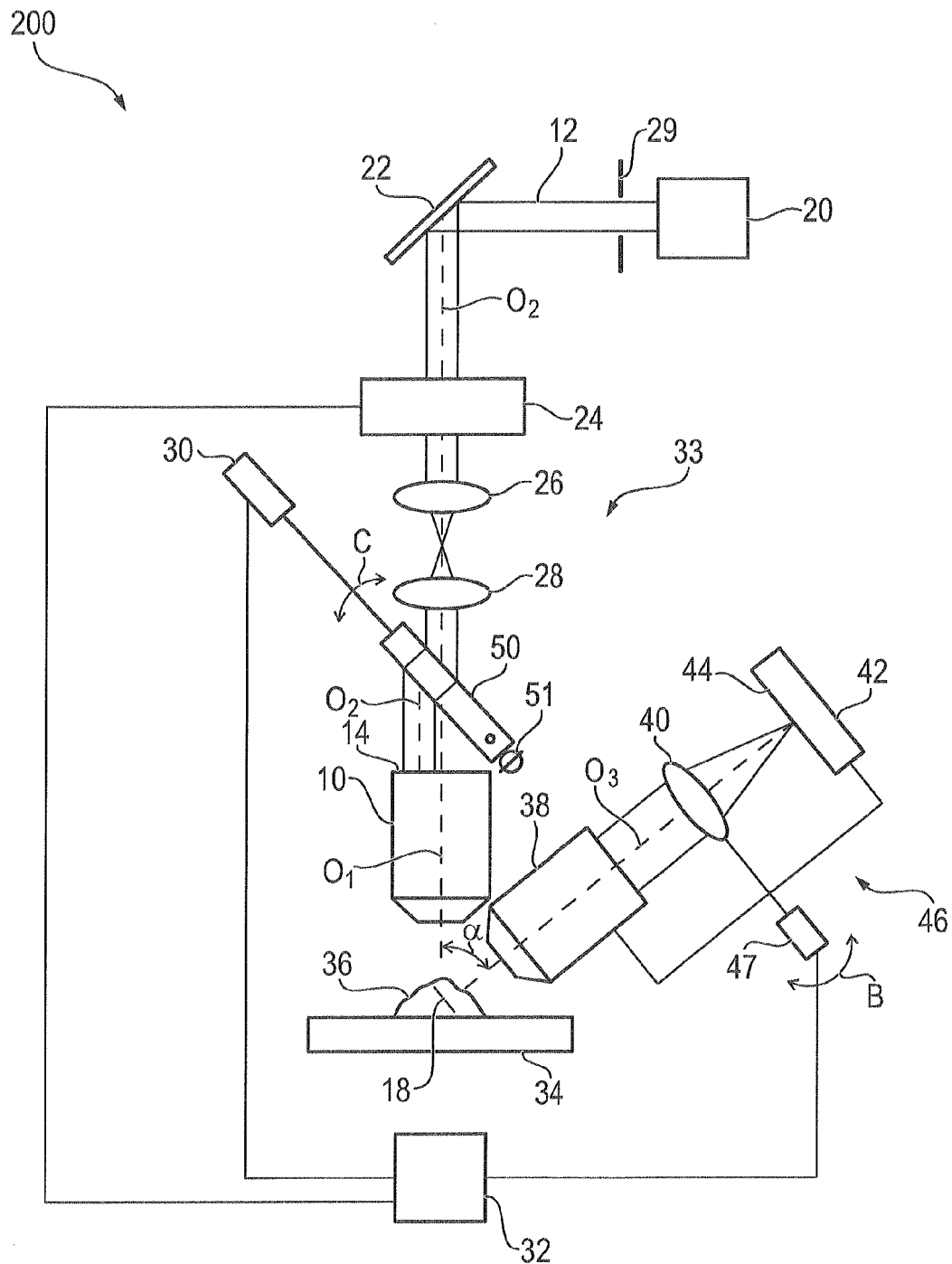
FIG. 8 is a view of a scanning confocal microscope according to a second embodiment.

FIG. 8 shows a scanning microscope 200 as a second exemplary embodiment. The components of scanning microscope 200 which correspond with those of scanning microscope 100 shown in FIG. 5 have the same reference numerals as in FIG. 5 and will not be described again below.

The exemplary embodiment shown in FIG. 8 differs from that of FIG. 5 in that, in front of observation optics 10, a transparent plane-parallel plate 50, for example, a glass plate, is mounted so as to be tiltable in a tilting direction C to adjust the off-center entry of illuminating light beam 12 into entrance pupil 14 of illumination optics 10. Plane-parallel plate 50 is disposed in the path of illuminating light beam 12 between tube lens 28 and entrance pupil 14 and is aligned at an angle to optical axis O1 of illumination optics 10. Because of this, illuminating light beam 12 undergoes a parallel displacement as it passes through plane-parallel plate 50, causing it to enter entrance pupil 14 of illumination optics 10 at an off-center position.

The parallel displacement of illuminating light beam 12 can be varied. To this end, plane-parallel plate 50, which is mounted so as to be tiltable about a pivot axle 51 extending perpendicularly to the plane of FIG. 8, is tilted by the actuator 30 in tilting direction C.

Figure 9:
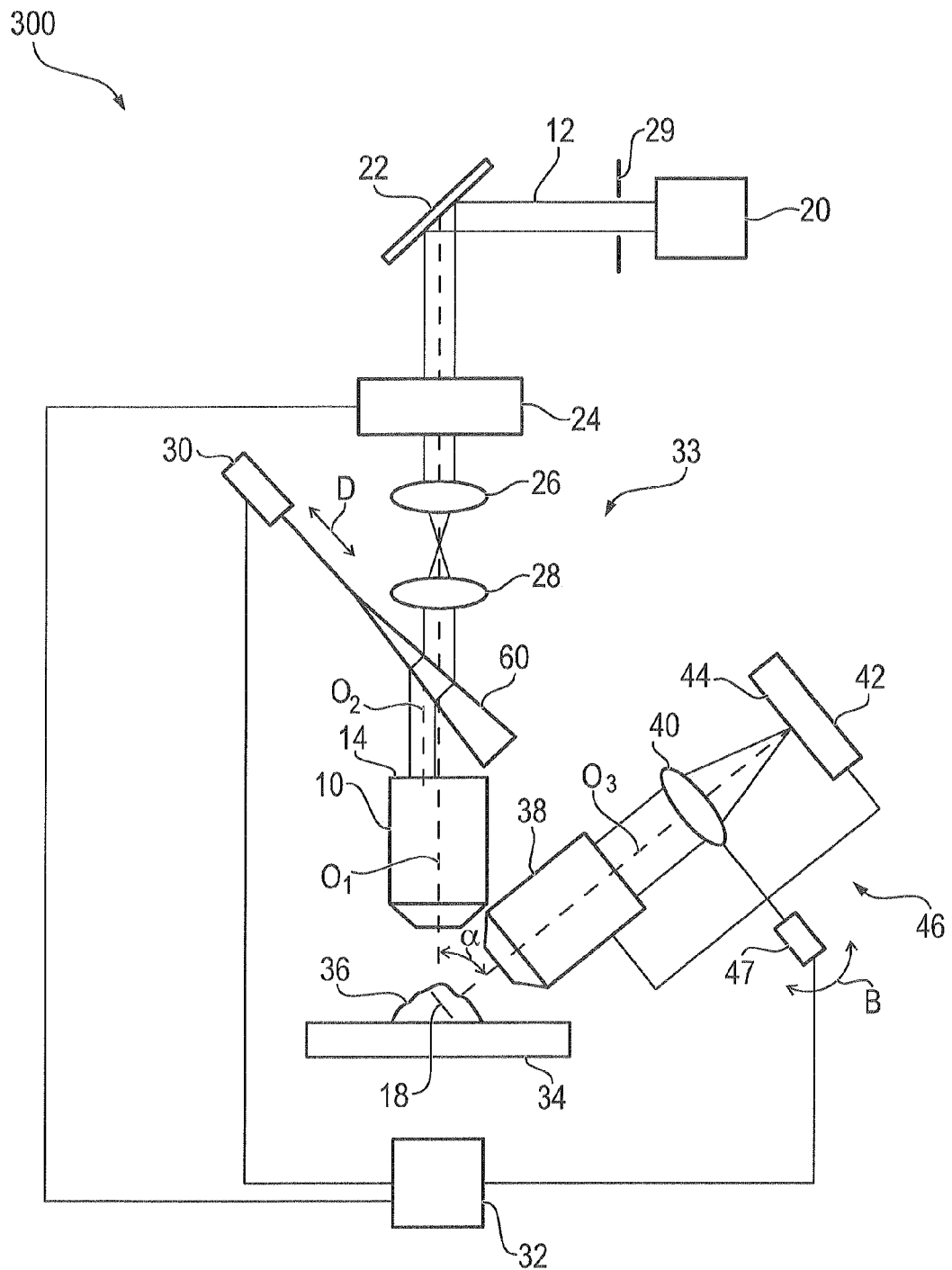
FIG. 9 is a view of a scanning confocal microscope according to a third embodiment.

FIG. 9 shows a scanning microscope 300 as a third exemplary embodiment. Scanning microscope 300 is modified from microscope 200 shown in FIG. 8 in that a transparent wedge-shaped plate 60, for example, a glass wedge is used in place of plane-parallel plate 50. Wedge-shaped plate 60 also causes a lateral displacement of illuminating light beam 12 when it passes through wedge-shaped plate 60. In this exemplary embodiment, actuator 30 does not move wedge-shaped plate 60 perpendicularly to optical axis O1 of illumination optics 10, but along an adjustment direction D which is at an angle to optical axis O1.

Figure 10:
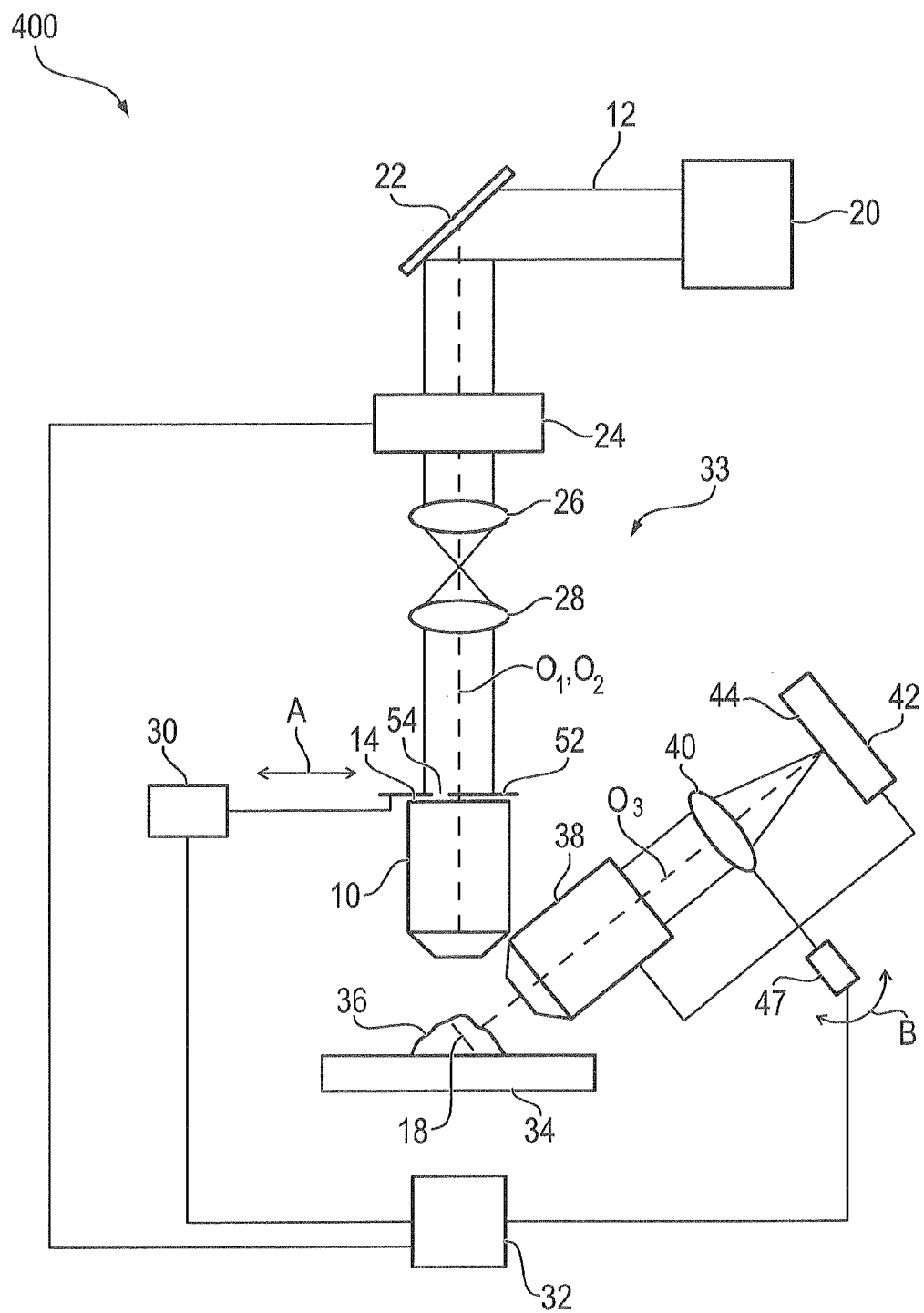
FIG. 10 is a view of a scanning confocal microscope according to a fourth embodiment.

FIG. 10 shows a scanning microscope 400 as a fourth exemplary embodiment. This exemplary embodiment differs from that shown in FIG. 8 in that an aperture plate 52, which is mounted so as to be movable along adjustment direction A, is provided in place of plane-parallel plate 50 to achieve off-center entry of illuminating light beam 12 into entrance pupil 12. Aperture plate 52 has a variable aperture opening 54 which restricts the diameter of illuminating light beam 12 as it passes therethrough so as to obtain the desired partial illumination of entrance pupil 14. Since aperture opening 54 can be adjusted as desired, the aperture element 29 provided in the aforedescribed exemplary embodiments can be omitted in the exemplary embodiment shown in FIG. 10.

FIG. 11 once again illustrates the function of aperture plate 52. The portion of illuminating light beam 12 that passes through aperture opening 54 is displaced from the center of the pupil by actuator 30 moving aperture plate 52 perpendicularly to optical axis O1 of illumination optics 10. As the portion of illuminating light beam 12 that is allowed to pass through shifts from the center toward the edge of the pupil, illumination focus 16 is increasingly inclined with respect to optical axis O1.

Figure 11:
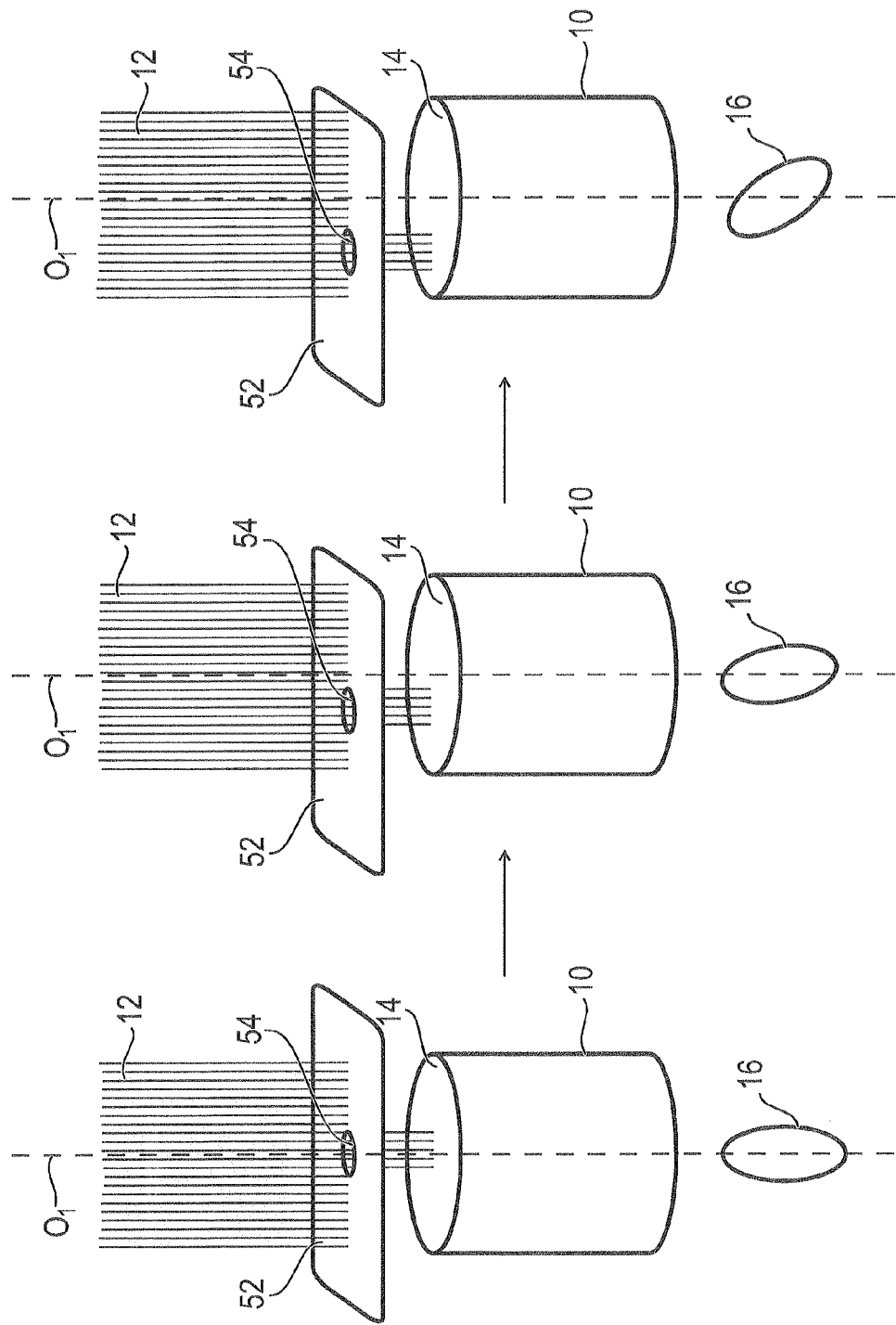
FIG. 11 is a schematic view showing how the illumination focus is inclined by moving an aperture plate provided in the scanning microscope shown in FIG. 10.

In FIG. 11, aperture plate 52 is shown at some distance from entrance pupil 14 to simplify the representation. However, it should be noted that it is preferred for aperture plate 52 to be disposed as close as possible to entrance pupil 14 in order not to negatively affect the tilting motion of illuminating light beam 12 in entrance pupil 14, which serves to move illumination focus 16.

Figure 12:
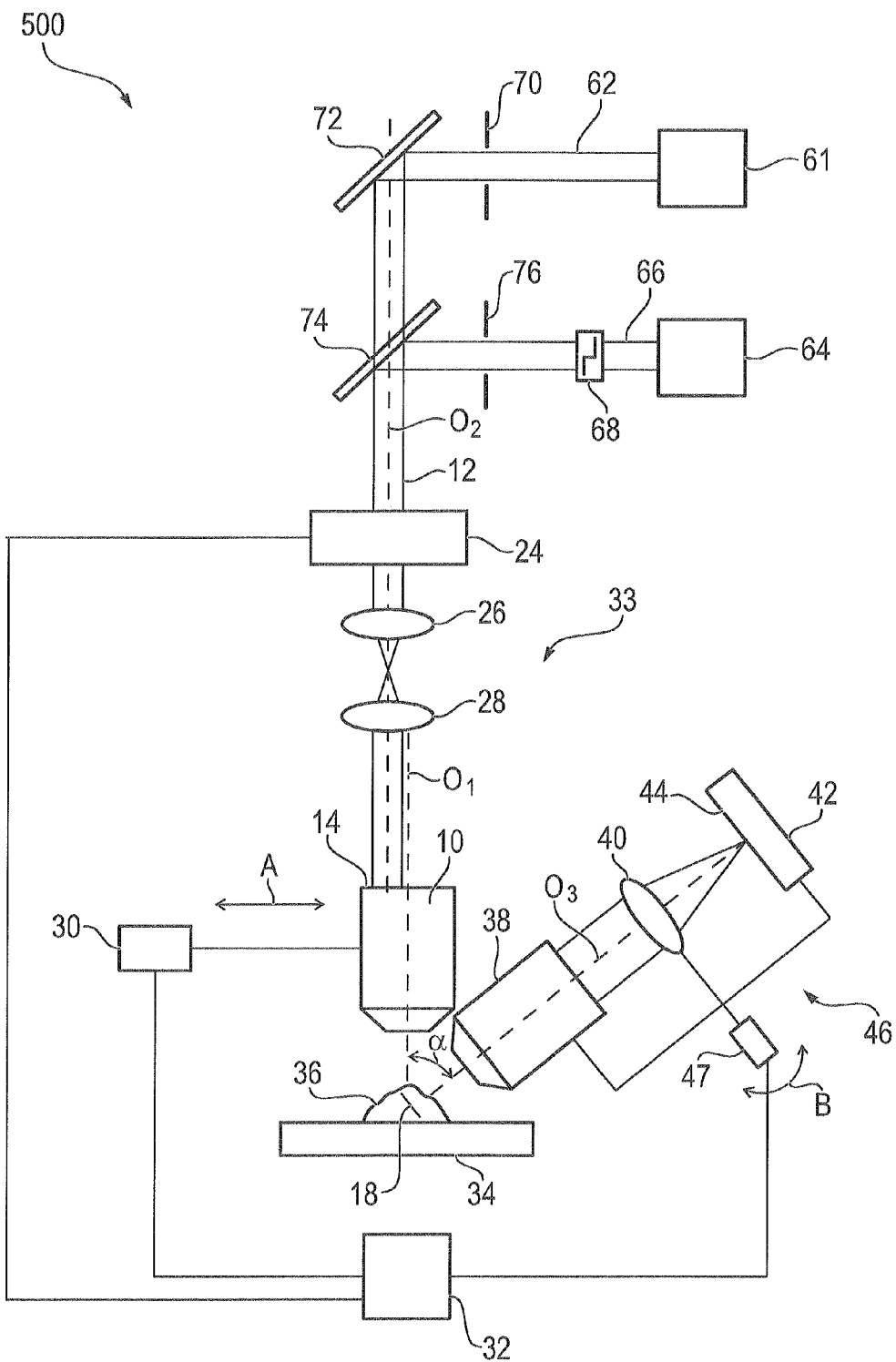
FIG. 12 is a view of a scanning confocal microscope according to a fifth embodiment, which operates according to the STED method.

FIG. 12 shows a scanning microscope 500 as a fifth exemplary embodiment. Scanning microscope 500 is modified from the exemplary embodiment shown in FIG. 5 in that it is designed to achieve a spatial resolution beyond the diffraction limit using the generally known STED method. In this connection, it should be noted that this modification is not only possible for the exemplary embodiment shown in FIG. 5, but also for all other exemplary embodiments.

Scanning microscope 500 includes an excitation light source 61, which emits an excitation beam 62 whose wavelength is selected such that the fluorescent dyes used are excited to emit fluorescent radiation. Scanning microscope 500 further includes a depletion light source 64, which emits a depletion beam 66 which is superimposed on excitation beam 62 in a manner described further below, and whose wavelength is selected such that the fluorescent dyes illuminated by excitation beam 62 are depleted by stimulated emission, and thus, as it were, switched off. Depletion beam 66 emitted by depletion light source 64 passes through a phase plate 68 which serves to achieve the desired intensity profile for depletion beam 66.

Excitation beam 62 passes through an aperture 70 and strikes a minor 72 which reflects excitation beam 62 toward a beam splitter 74. Beam splitter 74 is adapted to let excitation beam 62 through and to reflect the depletion beam 66 passing through phase plate 68 and a further aperture 76. In this manner, excitation beam 62 and depletion beam 66, whose intensity profile is influenced by phase plate 68, are superimposed on each other. The two superimposed beams 62 and 66 then form illuminating light beam 12.

FIGS. 13a and 13b illustrate how the superposition of excitation beam 62 and depletion beam 66 leads to an increase in the resolving power of the microscopy method used.

Since, in this case, illuminating light beam 12 is formed by superposition of excitation beam 62 and depletion beam 66, illumination optics 10 produce an excitation focus 80 and a depletion focus 82, which are superimposed to form an illumination focus, which is denoted by 84 in FIGS. 13a and 13b. Excitation focus 80 shown in FIGS. 13a and 13b corresponds in shape to illumination focus 16 shown in FIGS. 3 and 4.

In FIG. 13b, excitation focus 80, depletion focus 82, and the resulting illumination focus 84 are shown in a sectional view parallel to the x-z plane. As can be seen in this view, depletion focus 82 has a spatial light intensity distribution where the light intensity is zero in the plane in which the illumination focus 84 composed of excitation focus 80 and depletion focus 82 is moved, and exhibits a maximum on both sides of said plane. The aforementioned plane, designated 86 in FIG. 13b, lies parallel to a plane which contains the y-axis and whose line of intersection with the x-z plane forms an angle with the x-axis. This angle is dependent on the maximum acceptance angle of the illumination optics 10 used and on the degree to which illuminating light beam 12 is widened and displaced from the center.

Since excitation focus 80 is superimposed with depletion focus 82 above and below this plane of motion 86, the excitation effect of excitation focus 80 is reduced from above and below said plane of motion 86. The portion of excitation focus that is effective in terms of excitation is shown in hatched shading in FIG. 13b.

In FIG. 13b, the direction in which excitation focus 62 is, as it were, constricted is indicated by a line 88. This direction of constriction 88 is perpendicular to plane of motion 86. The superposition of excitation focus 80 and depletion focus 82, as it were, makes the excitation-producing light sheet thinner, thereby increasing the spatial resolution.

LIST OF REFERENCE NUMERALS 10 illumination optics
12 illumination light beam
14 entrance pupil
16 illumination focus
18 light sheet
20 laser light source
22 mirror
24 mirror system
26 scanning lens
28 tube lens
30 actuator
32 control unit
34 microscope slide
36 object
38 observation objective
40 tube lens
42 photodetector
44 light-receiving surface
46 detection unit
47 actuator
50 plane-parallel plate
51 pivot axle
52 aperture plate
54 aperture opening
60 wedge-shaped plate
61 excitation light source
62 excitation beam
64 depletion light source
66 depletion beam
68 phase plate
70 aperture
72 mirror
74 beam splitter
76 aperture
80 excitation focus
82 depletion focus
84 illumination focus
86 plane of motion
88 plane of constriction

What is claimed is:

1. A scanning microscope (100, 200, 300, 400, 500); comprising:
    a light source (20, 61, 64) for emitting an illuminating light beam (12),
    illumination optics (10) for producing an elongated illumination focus (16, 84) in an object (36) to be imaged, and
    a scanning device (33) for moving the illumination focus (16, 84) across a target region to be illuminated of the object (36) to be imaged and doing so by varying the direction of incidence in which the illuminating light beam (12) enters an entrance pupil (14) of the illumination optics (10),
    wherein
    in order to incline the illumination focus (16, 84) relative to the optical axis (O1) of the illumination optics (10), the scanning device (33) directs the illuminating light beam (12) onto a portion of the entrance pupil (14) of the illumination optics (10) that is offset from the center of the pupil and, in order to move the illumination focus (16, 84) across the target region to be illuminated, the scanning device varies the direction of incidence of the illuminating light beam (12) within said portion; and
    an observation objective (38) is provided which is spatially separated from the illumination optics (10) and disposed such that an optical axis (O3) of the observation objective is substantially perpendicular to a plane defined by the illuminated target region and at an acute angle (α) to the optical axis (O1) of the illumination optics (10).

2. The scanning microscope (100, 200, 300, 400, 500) as recited in claim 1,
    wherein
    in order to produce a light sheet (18) which is formed by the moving illumination focus (16, 84) and is inclined relative to the optical axis (O1) of the illumination optics (10), the scanning device (33) varies the direction of incidence of the illuminating light beam (12) in a plane of incidence which is parallel to and offset from the optical axis (O1) of the illumination optics (10); and
    the observation objective (38) is disposed such that its optical axis (O3) is perpendicular to the light sheet (18).

3. The scanning microscope (100, 200, 300, 400, 500) as recited in claim 2,
    wherein
    the scanning device (33) includes a control unit (32) and a first adjustment unit (30, 50, 52, 60) coupled to the control unit (32) for varying the inclination of the light sheet (18), as well as a second adjustment unit (47) coupled to the control unit (32) for moving the observation objective (38); and the control unit (32) controls the two adjustment units (30, 50, 52, 60; 47) in a synchronized manner such that the optical axis (O3) of the observation objective (38) remains oriented perpendicular to the light sheet (18) adjusted by the first adjustment unit (30, 50, 52, 60).

4. The scanning device (100) as recited in claim 3, wherein the illumination optics (10) is mounted so as to be movable along an adjustment direction (A) perpendicular to its optical axis (10); and the first adjustment unit includes an actuator (30) which moves the illumination optics (10) along the adjustment direction (A) to vary the inclination of the light sheet (18).

5. The scanning device (200, 300) as recited in claim 3, wherein the first adjustment unit includes:

an optical displacement element (50, 60) which is disposed in the path of the illuminating light beam (12) between the light source (20) and the illumination optics (10) and is mounted so as to be movable along an adjustment direction (A, C, D) transverse to the optical axis (O1) of the illumination optics (10) and which displaces the plane of incidence of the illuminating light beam (12) parallel to the optical axis (O1) of the illumination optics (10); and an actuator (30) which moves the displacement element (50, 60) along the adjustment direction (A, C, D) to vary the inclination of the light sheet (18).

6. The scanning device (200, 300) as recited in claim 5, wherein the optical displacement element is a transparent plane-parallel or wedge-shaped plate (50, 60).

7. The scanning microscope (400) as recited in claim 3, wherein the first adjustment unit includes:

an aperture (52) which is disposed in the region of the entrance pupil (14) of the illuminating optics (10) and has an aperture opening (54) allowing a portion of the illuminating light beam (12) to pass therethrough, and which is mounted so as to be movable along an adjustment direction (A) perpendicular to the optical axis (O1) of the illumination optics (10); and an actuator (30) which moves the aperture (52) along the adjustment direction (A) to vary the inclination of the light sheet (18).

8. The scanning microscope (100, 200, 300, 400, 500) as recited in claim 3, characterized by a photodetector (42) which, together with the observation objective (38), forms a detection unit (46) which can be moved by the second adjustment unit (47).

9. The scanning microscope (100, 200, 300, 400, 500) as recited in claim 1, wherein the scanning device (33) has a mirror system (24) which reflects the illuminating light beam (12) emitted by the light source (20, 61, 64) onto the portion of the entrance pupil (14) that is offset from the center of the pupil and, and a mirror actuator which allows the mirror system to be moved in order to vary the direction of incidence of the illuminating light beam (12).

10. The scanning microscope (100, 200, 300, 400, 500) as recited in claim 2, wherein the portion of the entrance pupil (14) of the illumination optics (10) that is traversed by the illuminating light beam (12) occupies about 0.1% to 50% of the total area of the entrance pupil (14); and the parallel displacement of the plane of incidence with respect to the optical axis (O1) of the illumination optics (10) is about 4 to 96% of the radius of the entrance pupil (14).

11. The scanning microscope (500) as recited in claim 1, wherein the illuminating light beam (12) is composed of an excitation beam (62) and a depletion beam (66) which are superimposed on each other before entering the scanning device (33); and the illumination optics (10) produces an excitation focus (80) from the excitation beam (62) and a depletion focus (82) from the depletion beam (66), said excitation focus and said depletion focus being superimposed on each other to form the illumination focus (84).

12. The scanning device (500) as recited in claim 11, wherein the depletion focus (82) has a spatial light intensity distribution which exhibits a minimum in a plane (86) in which the illumination focus (84) composed of the excitation focus (80) and the depletion focus (82) is moved to generate a light sheet, as well as a maximum on both sides of said plane (86).

13. A method for light-microscopic imaging of an object (36), comprising the following steps:

emitting an illuminating light beam (12), producing an elongated illumination focus (16, 84) in the object (36) to be imaged by means of illumination optics (10), moving the illumination focus (16, 84) across a target region to be illuminated of the object (36) and doing so by varying the direction of incidence in which the illuminating light beam (12) enters an entrance pupil (14) of the illumination optics (10), wherein in order to incline the illumination focus (16, 84) relative to the optical axis (O1) of the illumination optics (10), the illuminating light beam (12) is directed onto a portion of the entrance pupil (14) that is offset from the center of the pupil and, in order to move the illumination focus (16, 84) across the target region to be illuminated, the direction of incidence of the illuminating light beam (12) is varied within said portion; and the target region illuminated with the inclined illumination focus (16, 84) is imaged by an observation objective (38) which is spatially separated from the illumination optics (10) and disposed such that an optical axis (O3) of the observation objective is substantially perpendicular to a plane defined by the illuminated target region and at an acute angle ($\alpha$) to the optical axis (O1) of the illumination optics (10).

14. The method as recited in claim 13, wherein in order to produce a light sheet (18) which is formed by the moving illumination focus (16, 84), the direction of incidence of the illuminating light beam (12) is varied in a plane of incidence which is parallel to and offset from the optical axis (O1) of the illumination optics (10); and the optical axis (O3) of the observation objective (38) is disposed perpendicular to the light sheet (18).

15. The method as recited in claim 14, wherein the inclination of the light sheet (18) varies, and the observation objective (38) is moved in synchronization with this variation in the inclination of the light sheet (18) such that the observation objective (38) remains oriented with its optical axis (O3) perpendicular to the adjusted light sheet (18).

16. The method as recited in claim 15,
wherein the observation objective (38) is moved together with a photodetector (42).

17. The method as recited in claim 14,
wherein
the illuminating light beam (12) is composed of an excitation beam (62) and a depletion beam (66); and
an excitation focus (80) is produced from the excitation beam (62) and a depletion focus (82) is produced from the depletion beam (66), said excitation focus and said depletion focus being superimposed on each other to form the illumination focus (84).

18. The method as recited in claim 17,
wherein the spatial intensity distribution of the depletion focus (82) is adjusted such that it exhibits a minimum in a plane (86) in which the illumination focus (84) composed of the excitation focus (80) and the depletion focus (82) is moved to generate a light sheet, as well as a maximum on both sides of said plane (86).

* * * * *